United States Patent
Gole et al.

(10) Patent No.: US 7,716,420 B2
(45) Date of Patent: May 11, 2010

(54) METHODS OF CONVERTING TRADITIONAL VOLUMES INTO FLEXIBLE VOLUMES

(75) Inventors: Abhijeet Gole, Cupertino, CA (US); Joydeep Sen Sarma, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 296 days.

(21) Appl. No.: 11/414,784

(22) Filed: Apr. 28, 2006

(65) Prior Publication Data

US 2007/0255921 A1    Nov. 1, 2007

(51) Int. Cl.
    *G06F 12/00*    (2006.01)
(52) U.S. Cl. .......................... 711/114; 711/4; 711/100; 711/102; 711/103; 711/104; 711/200; 711/201; 711/202; 711/203; 711/204; 711/205; 711/206; 711/209
(58) Field of Classification Search .............. 711/6, 711/100, 102–103, 200, 202–206, 209, 4, 711/114
    See application file for complete search history.

(56) References Cited

U.S. PATENT DOCUMENTS

| | | | |
|---|---|---|---|
| 5,568,629 A | 10/1996 | Gentry et al. | |
| 5,819,292 A | 10/1998 | Hitz et al. | |
| 5,889,934 A | 3/1999 | Peterson | |
| 6,732,124 B1 * | 5/2004 | Koseki et al. | ............... 707/202 |
| 7,127,577 B2 | 10/2006 | Koning et al. | |
| 7,237,021 B2 | 6/2007 | Penny et al. | |
| 7,409,494 B2 | 8/2008 | Edwards et al. | |
| 2005/0138308 A1 | 6/2005 | Morishita et al. | |
| 2006/0031634 A1 * | 2/2006 | Nagai et al. | ................. 711/113 |
| 2006/0224843 A1 * | 10/2006 | Rao et al. | .................... 711/161 |
| 2007/0083711 A1 * | 4/2007 | Bradford et al. | ............ 711/118 |

OTHER PUBLICATIONS

International Search Report and Written Opinion mailed Jul. 31, 2008, for International Application No. PCT/US07/05048, 7 pages.

* cited by examiner

*Primary Examiner*—Tuan V Thai
*Assistant Examiner*—Zhuo H Li
(74) *Attorney, Agent, or Firm*—Blakely, Sokoloff, Taylor & Zafman LLP

(57) ABSTRACT

A filer converts a traditional volume to a flexible volume by: creating an aggregate on storage devices other than the storage devices of the traditional volume; on the aggregate, creating a flexible volume large enough to store metadata describing files residing on the traditional volume; on the flexible volume, creating metadata structures that describe the files of the traditional volume, except that the metadata indicates that data blocks and indirect blocks are absent and must be fetched from another location. As the filer handles I/O requests directed to the flexible volume, the filer calculates physical volume block number (PVBN) addresses where the requested blocks would be located in the aggregate and replaces the absent pointers with the calculated addresses. After the absent pointers have been replaced, the filer adds the storage devices of the traditional volume.

21 Claims, 7 Drawing Sheets

METHODS OF CONVERTING TRADITIONAL VOLUMES INTO FLEXIBLE VOLUMES

CROSS REFERENCE TO RELATED APPLICATIONS (Not applicable)

STATEMENT REGARDING FEDERALLY SPONSORED RESEARCH OR DEVELOPMENT (Not applicable)

BACKGROUND OF THE INVENTION

The present invention relates to network storage systems and, more particularly, to systems and methods for converting existing traditional storage volumes in network storage systems into flexible storage volumes, without disrupting the network storage systems.

A network storage system typically includes one or more specialized computers (variously referred to as file servers, storage servers, storage appliances or the like, and collectively hereinafter referred to as "filers"). Each filer is connected to one or more storage devices, such as via a storage network or fabric. Exemplary storage devices include individual disk drives, groups of such disks and redundant arrays of independent (or inexpensive) disks (RAID groups). The filer is also connected via a computer network to one or more clients, such as computer workstations, application servers or other computers. Software in the filers and other software in the clients cooperate to make the storage devices, or groups thereof, appear to users of the workstations and to application programs being executed by the application servers, etc., as though the storage devices were locally connected to the clients.

Centralized data storage (such as network storage) enables data stored on the storage devices to be shared by many clients scattered remotely throughout an organization. Network storage also enables information systems (IS) departments to store data on highly reliable and sometimes redundant equipment, so the data remain available, especially in the event of a catastrophic failure of one or more of the storage devices. Network storage also facilitates making frequent backup copies of the data and providing access to backed-up data, when necessary.

Filers can also perform other services that are not visible to the clients. For example, a filer can treat all the storage space in a group of storage devices as an "aggregate." The filer can then treat a subset of the storage space in the aggregate as a "volume." Each data block of a storage device has an associated block number (a "disk block number" (DBN)), which serves as an address of the block on the storage device. Thus, each storage device can be thought of as providing an address space of blocks extending from DBN 0 (zero) to DBN (N−1), where the disk has N blocks. The address space of a volume consists of a concatenation of the address spaces of the portions of the aggregate that make up the volume. The blocks of this concatenated address space are consecutively numbered 0 (zero) to (M−1), and these numbers are referred to as "volume block numbers" (VBNs).

Filers include software that enables clients to treat each volume as though it were a single disk. The clients issue input/output (I/O) commands to read data from or write data to the volume. The filer accepts these I/O commands; ascertains which storage device(s) are involved; calculates appropriate DBNs; issues I/O commands to the appropriate storage device(s) of the volume to fetch or store the data; and returns status information (and, in the case of a read command, data) to the clients.

Some filers also implement "flexible volumes." In contrast with traditional volumes (described above), a flexible volume is implemented as a file (a "container file") on a volume or in an aggregate. Flexible volumes provide several advantages over traditional volumes. For example, storage space on the set of storage devices need not be pre-allocated to the container file. Although each flexible volume is created with a specified size, this size merely indicates a potential storage capacity of the flexible volume. Actual physical blocks on the storage devices are not allocated to the flexible volume until they are needed. For example, when the filer flushes its cache of modified ("dirty") blocks, actual disk blocks are allocated to the flexible volume, up to the specified size of the flexible volume.

Another advantage of flexible volumes lies in the fact that the size of a flexible volume can be increased. Again, storage space on the storage devices is not necessarily allocated to the flexible volume to support the increased container file size until the storage space is actually needed. Furthermore, additional storage devices can be added to the set of storage device on which the container file is stored, thus increasing the potential maximum size to which the container file can be extended. Thus, flexible volumes provide greater flexibility and scalability than traditional volumes.

Filers enable clients to treat flexible volumes in the same way the clients treat traditional volumes, i.e., the clients can treat each flexible volume as though it were a single disk and issue I/O commands to the flexible volume, and each flexible volume presents an address space of numbered (addressed) blocks. Because physical storage space is not necessarily allocated to all the blocks of a flexible volume, the flexible volume is a virtual entity. That is, from the perspective of the clients, a flexible volume exists as a single disk drive. However, the filer creates this illusion, thus the block numbers of a flexible volume are referred to as "virtual volume block numbers" (VVBNs).

When a client issues an I/O command to read data from or write data to a flexible volume, the filer accepts the I/O command. The filer then issues one or more I/O commands to the appropriate block(s) of the container file to fetch or store the data. That is, the filer calculates the "physical volume block numbers" (PVBNs) on the storage devices that correspond to the VVBNs of the flexible volume that were referenced by the I/O command. The filer issues one or more I/O commands to the underlying storage devices and then returns status information (and, in the case of a read command, the requested data) to the client.

Due to the way a container file is typically distributed across its underlying storage devices, I/O performance when accessing data on a flexible volume can be better than if the data access requests were directed to a traditional volume.

The recognized advantages of flexible volumes over traditional volumes have sparked interest in converting existing traditional volumes into flexible volumes. However, existing methods of converting traditional volumes to flexible volumes have attendant problems. For example, a "snapshot" is a read-only, space-conservative version of an active file system at a given instant, i.e., when the snapshot is created as a persistent point-in-time image. A "brute force" conversion method copies all data from a single traditional volume snapshot into a flexible volume in a new aggregate having at least the same size as the traditional volume. However, this technique has several shortcomings. First, only a single snapshot of data is preserved. Second, because the new aggregate must be the same size as, or larger than, the traditional volume, this technique doubles the number of disks required during the conversion. Finally, the copying process is disruptive, because no modifications to the data can be made while the copying operation is taking place.

A second method of converting traditional volumes to flexible volumes involves copying traditional volume snapshots on a per Qtree basis. A Qtree is an entire volume or a subset of a volume that can be treated somewhat like a volume. Once each snapshot has been copied, a snapshot is taken in each new flexible volume. The advantages of such a method include preserving all snapshots. In addition, each Qtree in the traditional volume becomes an independent flexible volume in the new aggregate. However, this method also requires twice the number of disks, and the process is disruptive, because no modifications to the data can be made while the copying operation is taking place.

A third method of converting traditional volumes to flexible volumes involves an inode-by-inode copying of a traditional volume into dual volume block number (VBN) buffer trees in the flexible volume. (U.S. Pat. No. 5,819,292 to Hitz, et al., which is incorporated in its entirety herein by reference, describes various embodiments of the operational association between inodes (index nodes), buffer trees, indirect buffers, direct buffers, data blocks, and the like.) Once the dual VBN buffer trees have been created in the flexible volume, the data in the traditional volume are converted into the flexible volume in the aggregate. The third method requires fewer additional storage disks than the first two approaches, thereby reducing cost. However, the conversion is more complex and no modifications to the data can be made during the copying operation.

Therefore, methods of converting existing traditional volumes into flexible volumes, while preserving snapshots, and without requiring a large number of additional disk, would be desirable.

BRIEF SUMMARY OF THE INVENTION

Methods, systems and control software are disclosed for converting existing traditional volumes into flexible volumes, without disrupting access to files on the traditional volume and without requiring a large number of additional storage devices. A traditional volume is converted into a flexible volume by: creating an aggregate on storage devices other than the storage devices of the traditional volume; on the aggregate, creating a flexible volume large enough to store metadata describing files residing on the traditional volume; on the flexible volume, creating metadata structures that describe the files of the traditional volume, except that the metadata indicates that data blocks and indirect blocks are absent and must be fetched from another location. For example, instead of storing an address of, or a pointer to, a location where a data block or an indirect block is stored on the flexible volume, a special value (referred to hereinafter as an "ABSENT" value) can be stored in the metadata to indicate that the data block or indirect block does not reside on the flexible volume and that the block must be fetched from another location. As the filer handles I/O requests directed to the flexible volume, the filer calculates physical volume block number (PVBN) addresses where the requested blocks would be located in the aggregate and replaces the ABSENT values with the calculated addresses. After the ABSENT values have been replaced, the filer adds the storage devices of the traditional volume.

During the conversion, the files on the traditional volume remain accessible. Furthermore, the amount of storage space required to initially create the flexible volume is small.

In one embodiment of the present invention, an existing traditional volume is converted into a flexible volume. The existing traditional volume has a first address space that contains a plurality of files and metadata files containing information about each of the plurality of files. An additional volume having a second address space is provided. A flexible volume is created in the additional volume. Metadata is stored on the flexible volume to describe at least some of the plurality of files on the traditional volume. The second address space is extended to include the at least some of the plurality of files on the traditional volume, such that each of the at least some of the plurality of files has an address in the second address space.

According to one aspect of the present invention, storing the metadata on the flexible volume includes storing ABSENT values in at least some of the metadata on the flexible volume.

According to another aspect of the present invention, responding to an input/output (I/O) request directed to at least a portion of one of the plurality of files includes calculating an address in the second address space implicated by the I/O request and replacing one of the ABSENT values in the metadata on the flexible volume with the calculated address in the second address space.

According to yet another aspect of the present invention, calculating the address in the second address space includes calculating a physical volume block number (PVBN) according to the formula:

$$PVBN=VBN+M,$$

where VBN is a volume block number in the first address space implicated by the I/O request; and M is a size of the additional volume.

According to one aspect of the present invention, responding to a subsequent I/O request directed to the at least a portion of the one of the plurality of files includes calculating a second volume block number (VBN1) in the first address space implicated by the I/O request, according to the formula:

$$VBN1=PVBN-M$$

and fulfilling the I/O request on the traditional volume using the calculated VBN1.

According to another aspect of the present invention, the traditional volume is implemented on at least one storage device, and at least one storage device is added to the additional volume, such that storage space on the at least one storage device is concatenated to the second address space.

According to yet another aspect of the present invention, at least a portion of any unallocated storage space of the at least one storage device is added to the additional volume.

According to one aspect of the present invention, space occupied by at least some of the metadata on the traditional volume is de-allocated.

According to another aspect of the present invention, blocks that stored the plurality of files on the traditional volume are allocated to the flexible volume.

According to yet another aspect of the present invention, the existing traditional volume has a size N that is greater than a size M associated with the additional volume.

According to one aspect of the present invention, the existing traditional volume stores a plurality of persistent point-in-time images, and storing the metadata on the flexible volume includes storing metadata on the flexible volume for each of the plurality of persistent point-in-time images.

According to another aspect of the present invention, storing the metadata on the flexible volume includes storing ABSENT values in at least some of the metadata on the flexible volume. In addition, the flexible volume is scanned for ABSENT values in the metadata. For at least one ABSENT value found while scanning the metadata, an address, in the second address space, of at least a portion of one of the plurality of files associated with the found ABSENT value is calculated and the found ABSENT value is replaced with the calculated address.

In another embodiment of the present invention, a system for converting an existing traditional volume into a flexible volume, the existing traditional volume having a first address space that contains a plurality of files and metadata files containing information about each of the plurality of files, includes a plurality of storage devices and a network storage filer. The network storage filer is communicably coupled to the plurality of storage devices and is operable to implement a traditional volume and to implement a flexible volume. The network storage filer is also operable to create a flexible volume on at least one of the plurality of storage devices, the at least one of the plurality of storage devices having a second address space; store metadata on the flexible volume to describe at least some of the plurality of files on the traditional volume; and extend the second address space to include at least some of the plurality of files on the traditional volume, such that each of the at least some of the plurality of files has an address in the second address space.

These and other features, advantages, aspects and embodiments of the present invention will become more apparent to those skilled in the art from the Detailed Description of the Invention that follows, in conjunction with the Drawings.

DETAILED DESCRIPTION OF THE INVENTION

Figure 1:
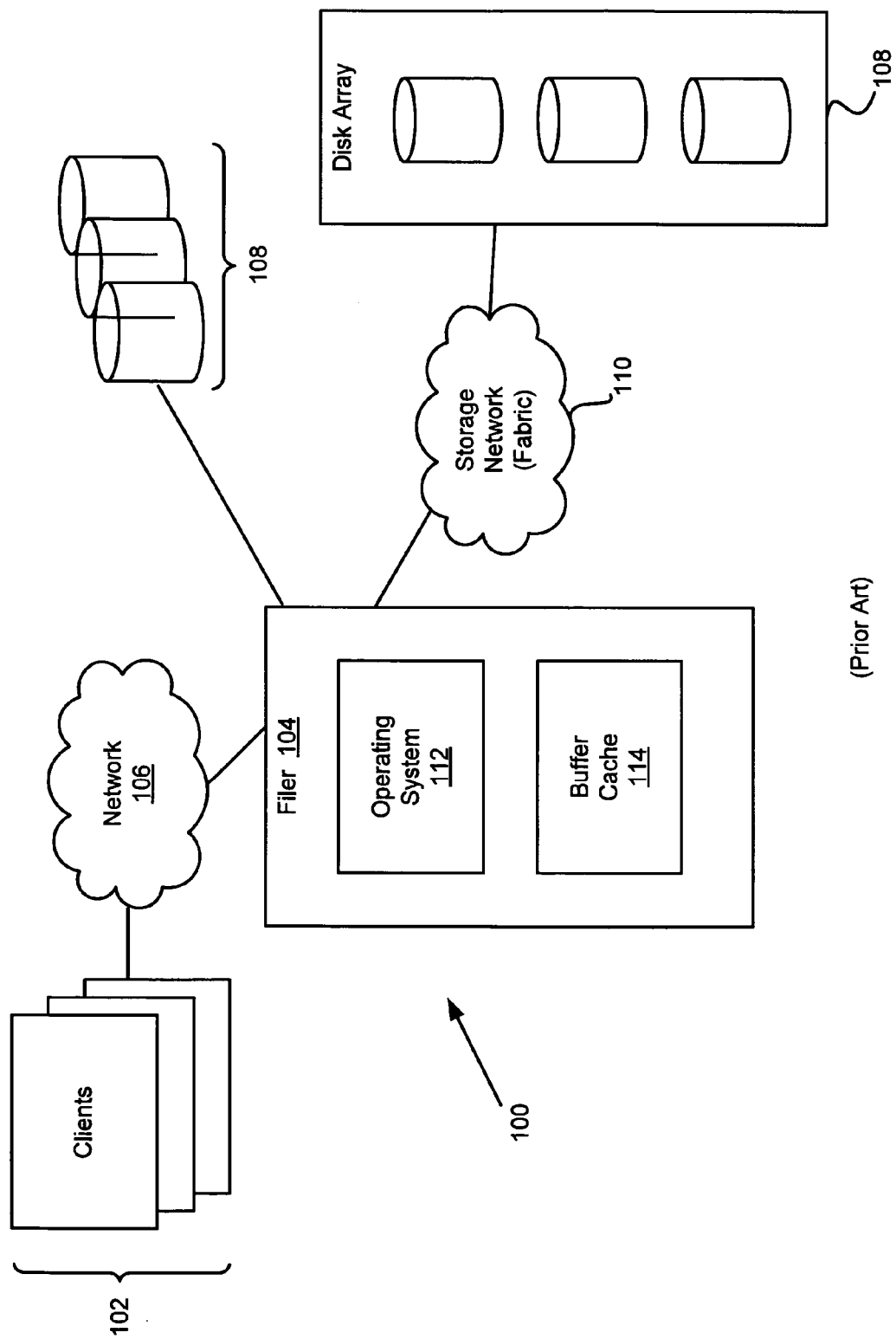
FIG. 1 is a block diagram of a prior art network storage system.

Disclosed are methods, systems and control software for converting existing traditional volumes into flexible volumes, such as in a network storage system. As previously noted, workstations and application servers (collectively "clients") are frequently connected to filers and/or storage devices via local or wide area networks (LANs or WANs) and/or storage networks. FIG. 1 shows an exemplary network storage system 100 in which the presently disclosed methods, systems and control software can be implemented. Clients 102 are connected to one or more filers 104 via a packet-switched network 106 (such as an Internet Protocol (IP) network). Storage devices 108 can be connected to the filer 104 directly and/or via a storage network or fabric 110. The storage devices 108 can be individual mass storage devices (such as a disks) or groups of storage device (such as RAID groups).

The filer 104 includes a memory (not shown) suitable for storing computer instructions that, when executed by a processor, perform the functions described herein and a processor (not shown) suitable for executing the instructions in the memory. The computer instructions in the memory include a suitable operating system, such as the Data ONTAP® operating system available from Network Appliance, Inc. of Sunnyvale, Calif. Other suitable operating systems can, of course, be used. The operating system 112 implements a suitable file system on the storage devices 108, as described below. Optionally, the operating system 112 operates a buffer cache 114, in which blocks of data (file data and metadata, as described below) are temporarily stored after being read from the storage devices 108 or before being written to the storage devices 108.

For purposes of presenting an exemplary implementation that can support converting an existing traditional volume into a flexible volume, assume that the filer 104 implements traditional volumes and flexible volumes that are stored on one or more of the storage devices 108. Thus, the filer 104 presents storage space of one or more of the storage devices 108 as a single volume (whether a traditional volume or a flexible volume) to the clients 102 as though the volume were a single disk drive. The clients 102 treat the volume as if it were a contiguous space of disk blocks. Suitable software to support flexible volumes is available from Network Appliance, Inc. of Sunnyvale, Calif.

Typically, the filer 104 manages storage space on the storage devices 108 on a per-volume basis. The filer 104 keeps track of which blocks of the volume are allocated to files, which blocks are unallocated (i.e., free), where (i.e., in which volume block) each portion of each file is stored, each file's name, directory, owner, protection (i.e., access rights by various categories of users), etc., as well as volume information, such as the size of the volume, the volume owner, protection, etc. This information collectively constitutes a "file system," as is well-known in the art. For example, the filer 104 can implement the Write Anywhere File Layout (WAFL®) file system, which is available from Network Appliance, Inc. of Sunnyvale, Calif. Alternatively, other file systems can be used.

According to the exemplary WAFL file system, storage space on a volume is divided into a plurality of 4 kilobyte (KB) blocks. Each block has a volume block number (VBN), which is used as an address of the block. Collectively, the VBNs of a volume can be thought of as defining an address space of blocks on the volume. As needed, blocks in this address space are allocated to files. Thus, each file consists of one or more 4 KB blocks stored on the volume. The 4 KB blocks of a file need not be contiguous. That is, the file can be fragmented, and its 4 KB blocks can be stored in various discontiguous locations on the volume.

Figure 2:
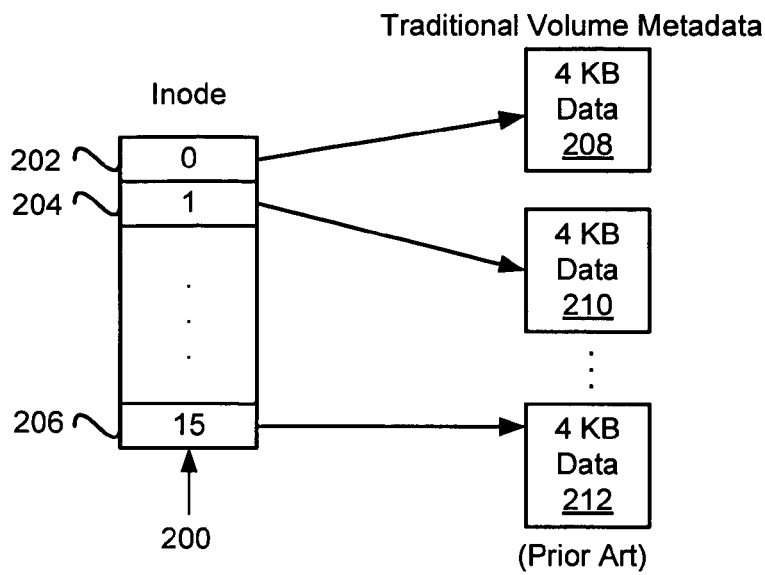
FIG. 2 is a block diagram of metadata stored on a volume of the network storage system of FIG. 1, in accordance with the prior art.
Figure 3:
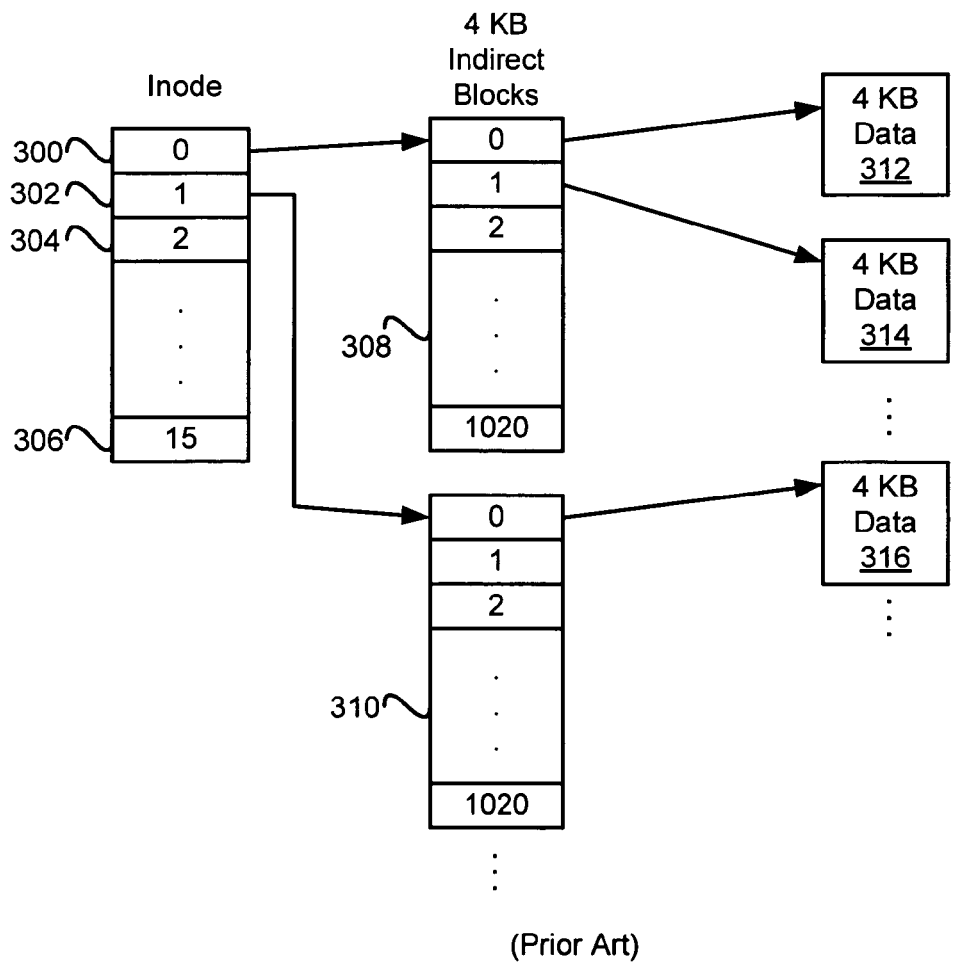
FIG. 3 is another block diagram of metadata stored on a volume of the network storage system of FIG. 1, in accordance with the prior art.

Each file on the volume is represented by a corresponding data structure commonly known as an index node ("inode"). Each inode is identified by a volume-unique identifier (typically a number), commonly known as a "file handle" or "file ID" (collectively hereinafter referred to as a file ID). The inode stores information about the file, such as where the file is stored on the volume. FIG. 2 shows an exemplary inode 200. The inode 200 contains up to 16 pointers 202, 204, . . . , 206. Each pointer 202-206 points to one of the 4 KB blocks 208, 210, . . . 212 of the file. Each pointer contains a volume block number (VBN), i.e., an address, of the 4 KB block. As shown in FIG. 3, if 16 pointers are insufficient to point to all the blocks of the file, i.e., if the file is larger than 64 KB (16 times 4 KB), each inode pointer 300, 302, 304, . . . , 306 points to a 4 KB "indirect block" 308, 310, etc., of pointers to the 4 KB blocks 312, 314, 316, etc., of the file. If 16 indirect blocks are insufficient to point to all the blocks of the file, i.e., the file is larger than 64 megabytes (MB) (16 times 64 KB), one or more additional layers of indirect blocks are used, as needed, to point to all the 4 KB blocks of the file. For very small files, i.e., files less than 64 bytes, no pointers are stored in the inode. Instead, the file contents are stored in the inode. Other file systems may use different sized block, different numbers of pointers, etc., however these differences are not relevant to the present invention.

Files are cataloged in a hierarchical set of directories, beginning at a root directory. Each directory is implemented as a special file stored on the same volume as the file(s) listed in the directory. Directories list files by name (typically alphabetically), to facilitate locating a desired file. A directory entry for a file contains the name of the file, the file ID of the inode for the file, access permissions, etc.

The inodes, directories and information about which blocks of the volume are allocated, free, etc. are collectively known as metadata. The metadata is stored in specially named files stored on the volume and, in some cases, in specific locations on the volume, such as in a "volume information block," as is well known in the art. An inode and data blocks of a file, together with any indirect blocks, are collectively known as a "buffer tree." Buffer trees are stored on volumes. However, to improve performance of the network storage system 100 (FIG. 1), the operating system 112 caches portions of buffer trees in the buffer cache 114. When one or more blocks need to be retrieved from disk, such as when the blocks are not in the buffer cache 114, but they are required to satisfy an I/O request made by a client 102, the operating system 112 executes a Load_Block( ) (or equivalent) routine. This routine converts the VBNs of the required blocks to DBNs, identifies the appropriate storage device(s) 108 and communicates with appropriate device drivers to cause the required blocks to be read from the storage device(s) 108 into the buffer cache 114.

Figure 4:
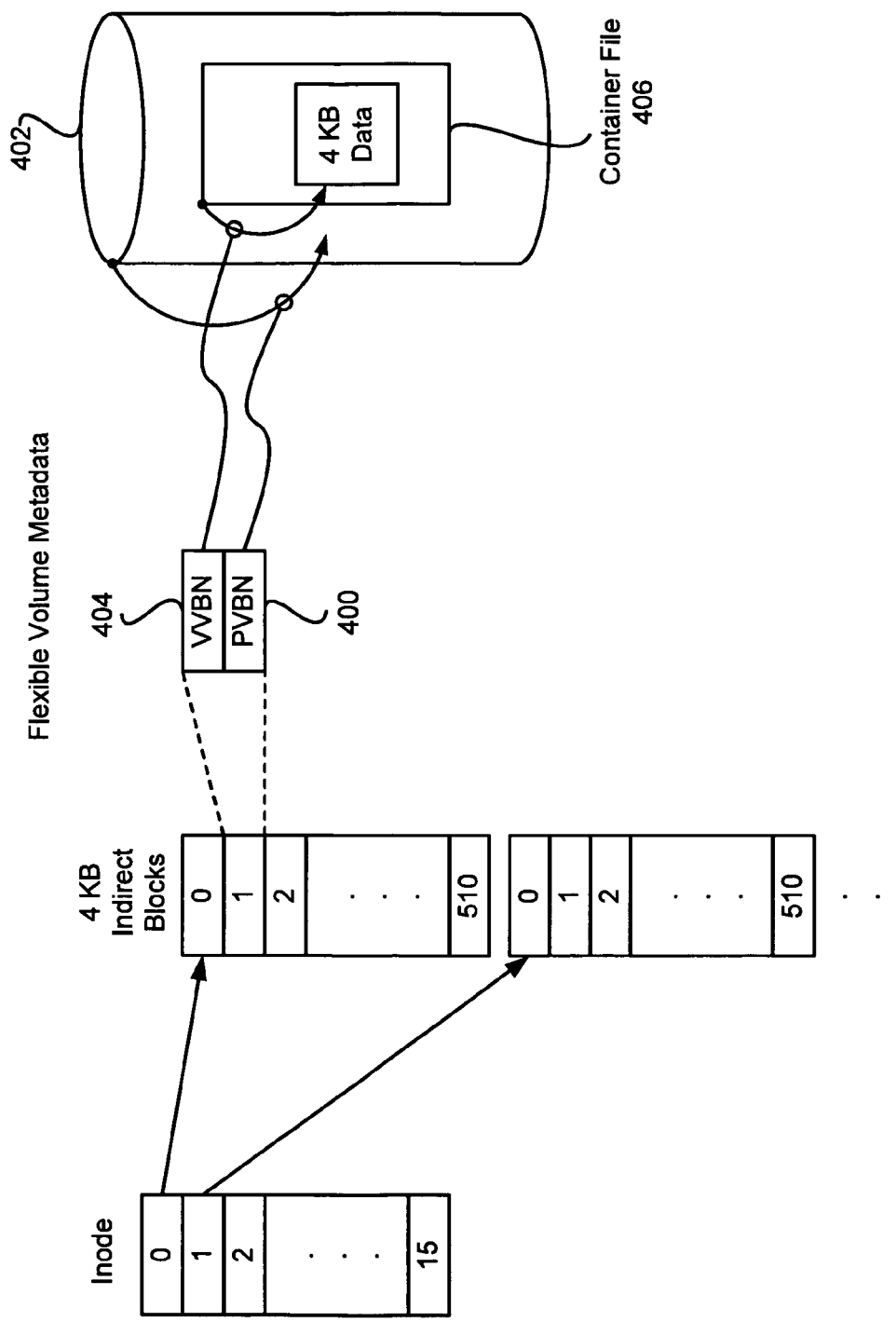
FIG. 4 is a block diagram of metadata stored on a flexible volume of the network storage system of FIG. 1.

As noted, a flexible volume is implemented as a container file on a traditional volume. As shown in FIG. 4, a flexible volume contains a file system structured similar to the file system of a traditional volume. That is, a flexible volume stores a buffer tree for each file on the flexible volume, a block allocation bitmap to keep track of free and allocated blocks on the flexible volume, etc. However, in one implementation of a flexible volume, each pointer contains two addresses. In a traditional volume, each pointer contains a VBN of a 4 KB data block or indirect block. However, in a flexible volume, each pointer contains both a physical and a virtual address of the 4 KB block. The physical address is referred to as a "physical volume block number" (PVBN) 400, which identifies the physical address of the pointed-to block, i.e., the VBN of the block on the traditional volume 402, relative to the beginning of the volume 402 (assuming a physical block has been allocated to store this block of the flexible volume). The virtual address is referred to as a "virtual volume block number" (VVBN) 404, which identifies the block within the container file 406, i.e., a block number relative to the beginning of the container file 406. Because the container file may be fragmented, there may not be a direct arithmetic conversion of PVBNs to or from VVBNs. The use of PVBNs 400 as block pointers provides efficient read access to data blocks, while the use of VVBNs as block pointers provides efficient access to required metadata.

As noted, each flexible volume pointer contains two addresses, however, flexible volumes use inodes and indirect blocks of the same size as are used in traditional volumes. Thus, the inodes and indirect blocks associated with flexible volumes can store only about half as many pointers as can be stored in corresponding traditional volume data structures. Consequently, buffer trees associated with flexible volumes often include one more level of indirection than traditional volume buffer trees for equally sized files. Additional information about flexible volumes is available in co-pending, commonly-assigned U.S. patent application Ser. No. 10/836,817, titled "Extension of Write Anywhere File System Layout" by John K. Edwards, et al, filed Apr. 30, 2004, the contents of which are hereby incorporated by reference.

Figure 5:
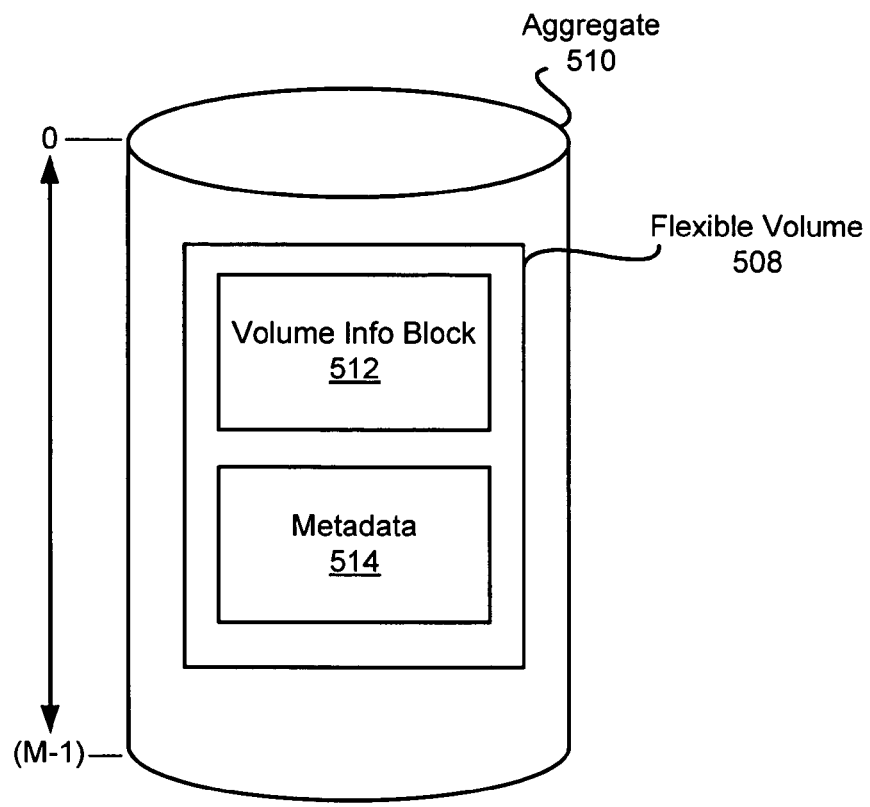
FIG. 5 is a block diagram of a traditional volume in the process of being converted to a flexible volume, according to one embodiment of the present invention.
Figure 5:
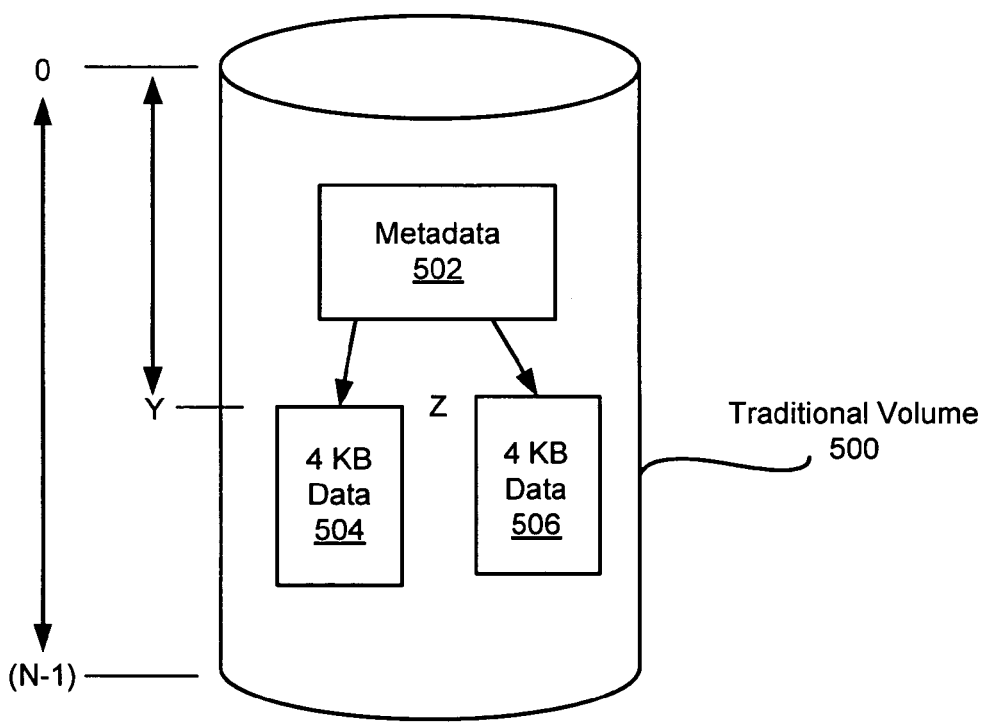

A method of converting a traditional volume to a flexible volume will now be described, beginning with reference to FIG. 5. Assume the traditional volume 500 consists of N blocks, numbered with VBNs 0 (zero) to (N−1). Thus, the traditional volume 500 has an address space 0 to (N−1). In addition, assume the traditional volume 500 stores a plurality of files and their corresponding metadata. For simplicity, the following description refers to only one of the plurality of files. Assume the traditional volume 500 stores metadata (an inode and, if necessary, one or more indirect blocks, etc.) 502 that describe a file, which occupies 4 KB data blocks 504 and 506. Assume the data block 504 is located at VBN Y on the traditional volume 500, and the data block 506 is located at VBN Z on the traditional volume 500.

Briefly, the method includes: creating an aggregate 510 on storage devices other than the storage devices of the traditional volume 500; creating a flexible volume 508 on the aggregate 510, the flexible volume 508 being large enough to store the metadata 502 of the traditional volume 500; creating metadata structures 514 on the flexible volume 508 that describe the files of the traditional volume 500, except that the metadata 514 on the flexible volume 508 indicates that data blocks and indirect blocks are absent and must be fetched from another location (i.e., from the traditional volume 500); as I/O requests are made to files on the flexible volume 508, redirecting these requests to the traditional volume 500 and replacing the ABSENT values with the actual block numbers on the traditional volume 500 (calculated as described below); and after all the ABSENT values have been replaced, adding the storage devices of the traditional volume 500 to the aggregate. These operations are described in detail below.

The flexible volume 508 is created, such as on an aggregate 510 or in another traditional volume (for simplicity, hereinafter referred to as "the aggregate 510" or "an additional volume"). That is, a container file is created on the aggregate 510. Assume the aggregate 510 has a size of M blocks, i.e., the aggregate 510 contains VBNs 0 (zero) to (M−1). Thus, the aggregate 510 has an address space 0 to (M−1).

As noted, the flexible volume 508 is a virtual entity. Thus, physical storage space need not be initially allocated to the flexible volume 508. Nevertheless, the flexible volume 508 has a virtual size. The size of the flexible volume 508 is reflected in a volume information block 512 in a well-known manner.

The flexible volume 508 is created with an initial size sufficient to store the metadata 502 from the traditional volume 500, or that portion of the traditional volume 500 that is to be converted to a flexible volume. As mentioned in the background section, one of the disadvantages of prior art conversion methodologies is the large amount, e.g., double, of storage space needed for the conversion. The disclosed method and system make it possible to convert an existing traditional volume to a flexible volume using less space.

Metadata 514 is stored in the flexible volume 508 to describe the flexible volume 508 and the files of the traditional volume 500. That is, a storage allocation bitmap, volume information and other file system data structures and files are created on the flexible volume 508 to manage the storage space of the flexible volume. Eventually, the storage devices of the traditional volume 500 will be added to the storage devices of the aggregate 510 to form an address space of VBNs that encompasses both the aggregate 510 and the traditional volume 500. Thus, the storage allocation bitmap of the aggregate 510 is large enough to map the blocks of the aggregate 510, as well as blocks of the traditional volume 500 that will eventually be added to the aggregate 510. In other words, the storage allocation bitmap is large enough to map VBNs 0 to (M−1) on the aggregate 510, as well as the VBNs 0 to (N−1) on the traditional volume 500. However, the blocks beyond VBN (M−1) are not initially available for allocation to the aggregate 510.

In addition, a buffer tree is created on the flexible volume 508 for each buffer tree on the traditional volume 500. For each file on the traditional volume 500, a corresponding inode and, if necessary, one or more indirect blocks are created on the flexible volume, as though the file were stored on the flexible volume 508. It should be noted that the metadata 514 created on the flexible volume 508 may contain one more level of indirection than the metadata 502 on the traditional volume 500, because, as noted above, metadata structures associated with flexible volumes can store only about half as many pointers as can be stored in corresponding traditional volume metadata structures.

In one method of creating the metadata 514, a buffer tree is created in the metadata 514 on the flexible volume 508 for each file on the traditional volume 500, and some or all of the information from the metadata 502 on the traditional volume 500 is copied into the metadata 514 on the flexible volume 508, except, as noted, ABSENT values, instead of PVBNs, are stored in the metadata 514. The buffer tree can be built "bottom-up," i.e., if, due to the file's size, one or more indirect blocks are needed to map the file, the lowest level indirect block(s) is (are) built first. That is, indirect blocks that point to the 4 KB data blocks of the file are built first. Then, successive levels of indirect blocks (if necessary) are built, and finally an inode is built. Other metadata 514, such as the storage allocation bitmap, root inode, etc., are modified as needed to reflect the existence of the blocks of the buffer tree on the flexible volume 508. For example, the storage allocation bitmap can be altered later, when disk blocks are actually allocated to the flexible volume 508. Other orders of building the metadata 514 are, of course, possible.

The metadata 514 created on the flexible volume 508 is similar to metadata on a conventional flexible volume, with the following exception. Rather than storing PVBNs in the metadata 514 on the flexible volume 508, special values are stored in the metadata 514. For each 4 KB block (data block or indirect block) that resides on the traditional volume 500, a special "ABSENT" value is stored in the corresponding pointer in the metadata 514 on the flexible volume 508. This ABSENT value indicates that the 4 KB block does not reside on the flexible volume 508, and that the block can be obtained from another location, namely from the traditional volume 500.

A volume that includes ABSENT values in its metadata is referred to as a "sparse volume." Additional information about sparse volumes is available in co-pending, commonly assigned U.S. Provisional Patent Application No. 60/674,430, titled "System and Method for Restoring Data On Demand for Instant Volume Restoration" by Jason Lango, et al., filed Apr. 25, 2005 and U.S. patent application Ser. No. (not yet assigned), titled "System and Method for Restoring Data On Demand for Instant Volume Restoration" by Jason Lango, et al., filed Apr. 24, 2006.

The metadata for the flexible volume 508 may be created in the buffer cache 114 (FIG. 1) of the filer 104, without necessarily immediately flushing the metadata from buffer cache 114 to the storage devices 108 on which the flexible volume 508 was created. Eventually, however, the filer 104 flushes the metadata from the buffer cache 114 to the storage devices 108, such as in the normal course of operation or, as described below, as a result of stimulated file activity. However, the metadata need not be flushed from the buffer cache 114 all at one time. That is, at various times, the filer 104 can flush various portions of the metadata.

Figure 6:
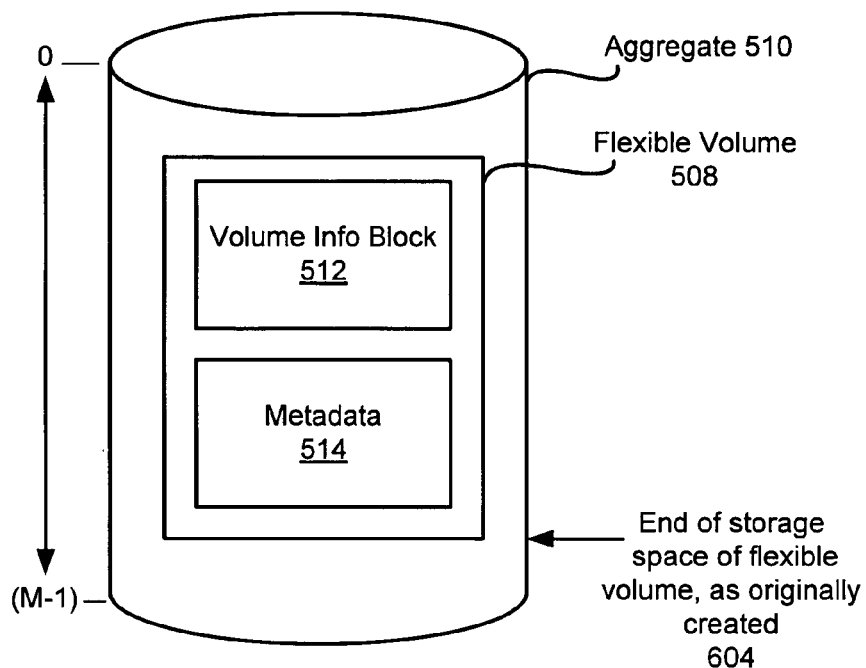
FIG. 6 is a block diagram of the traditional volume of FIG. 5 at a further stage of being converted to a flexible volume, according to one embodiment of the present invention.
Figure 6:
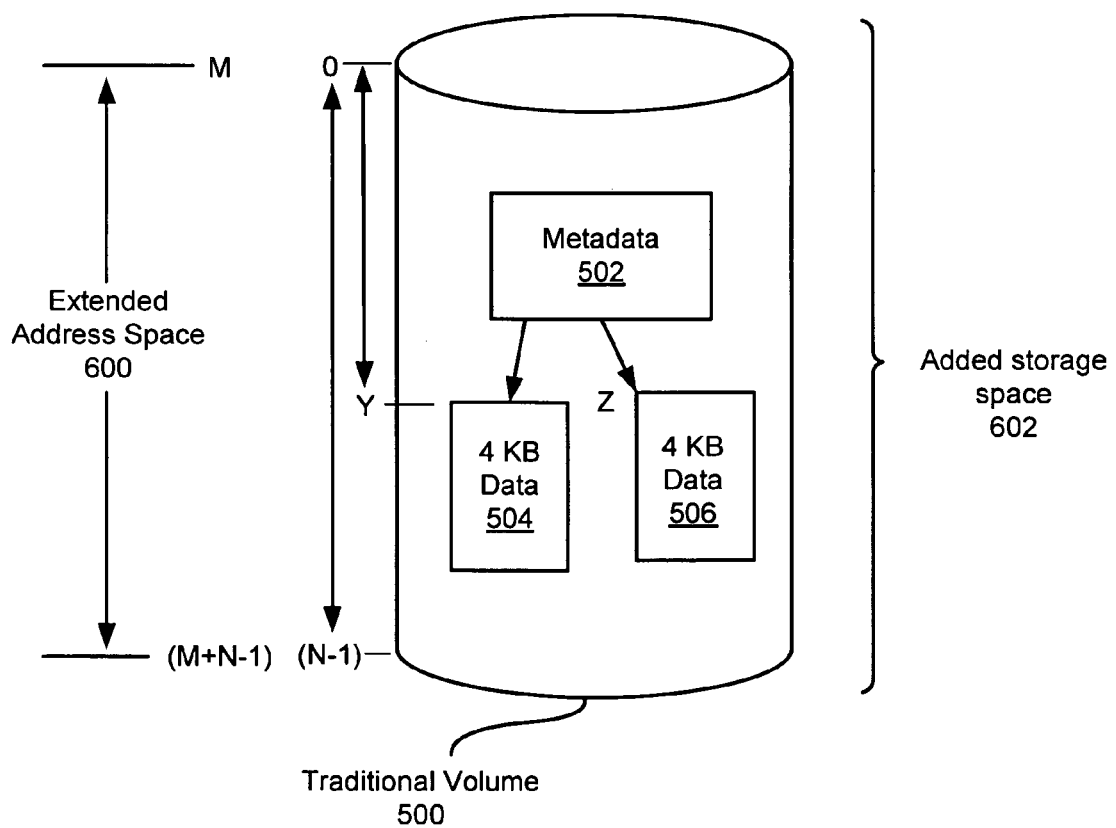

As shown in FIG. 6, the blocks of the traditional volume 500 are treated as though they were concatenated to the blocks of the aggregate 510. That is, a range of block numbers M to (M+N−1) is superimposed on the traditional volume 500, essentially extending the address space of the aggregate 510 by the size of the traditional volume 500, i.e., by N blocks. Blocks of this extended address space 600 correspond one-for-one with blocks of the traditional volume 500. That is, block numbers M to (M+N−1) of the extended address space 600 correspond to VBNs 0 to (N−1) of the traditional volume 500. A block number in the extended address space 600 can be calculated according to the following formula:

Block number in extended address space=VBN in traditional volume+$M$

Later, the storage devices 108 of the traditional volume 500 will be added to the aggregate 510. When that happens, the block numbers in the extended address space 600 will be VBNs of the added blocks. However, at the moment, the block numbers in the extended address space 600 cannot be used to directly access these blocks.

Once the metadata 514 is initialized on the flexible volume 508, including the ABSENT values, the flexible volume 508 is mounted and I/O requests that are directed to the traditional volume 500 are redirected to the flexible volume 508. For each I/O request, the metadata 514 is used to ascertain the VBN of the requested data. If the metadata 514 indicates that the requested data block is absent, the metadata 514 contains a pointer to the traditional volume 500, which contains the requested data. Thus, as I/O requests that are directed to the flexible volume 508 are received, the ABSENT values in the metadata 514 are used to locate the metadata 502 on the traditional volume 500 for the requested files and blocks.

The filer uses the metadata 502 to ascertain the VBN (in the traditional volume's address space) of the requested block. Recall that the metadata 502 contains pointers that comprise VBNs in the traditional volume's 500 address space (VBNs 0 to (N−1)), i.e., VBNs numbered relative to the beginning of the traditional volume. The filer 104 use the file ID of the file to locate the inode and, if necessary, the indirect block(s) for the file in the metadata 502. From this metadata 502, the filer 104 ascertains the VBN of the requested block within the VBN address space of the traditional volume 500. Once the VBN of the requested block is ascertained, the requested data is read from the traditional volume 500.

In addition, the ascertained VBN on the traditional volume 500 is used to calculate a replacement value for the ABSENT value in the metadata 514 on the flexible volume 508. The block number in the extended address space 600 corresponding to the VBN ascertained from the metadata 502 is calculated according to the above-referenced formula, and this block number is stored in the metadata 514 as a PVBN of the corresponding block. Essentially, the address where the requested data resides in what will be the flexible volume's address space (more specifically, an address within the extended address space 600) is calculated and used to replace the ABSENT value.

Because the ABSENT values are replaced as I/O requests are issued, the ABSENT values are replaced in the metadata 514 "on demand," i.e., as the blocks of the files of the volume are accessed. In addition, the storage allocation bitmap in the metadata of the aggregate 510 is adjusted to indicate that the PVBN is allocated in the range M to (M+N−1).

The manipulations of the metadata 514, such as replacing ABSENT values with PVBNs, can be performed in the buffer cache 114 (FIG. 1) of the filer 104, without necessarily writing these changes on the storage devices 108 on which the flexible volume 508 is implemented. That is, the buffer cache 114 need not be flushed immediately after the changes are made to the metadata in the buffer cache 114. Eventually, however, the filer 104 flushes the metadata from the buffer cache 114 to the storage devices 108, such as in the normal course of operation or, as described below, as a result of stimulated file activity. However, the metadata need not be flushed from the buffer cache 114 all at one time. That is, at various times, the filer 104 can flush various portions of the metadata.

Until the storage devices 108 of the traditional volume 500 are added to the aggregate 510, on subsequent requests for blocks that have had ABSENT values replaced with PVBNs, the PVBNs in the metadata 514 of the flexible volume 508 can be used to locate the requested data. When an I/O request is made to the flexible volume 508, and the PVBN is found to be greater than (M−1), i.e., beyond the end of the aggregate 510, a VBN on the traditional volume is calculated according to the following formula:

VBN on traditional volume=PVBN−M

The requested block is read or written on the traditional volume 500 using the calculated VBN.

Figure 7:
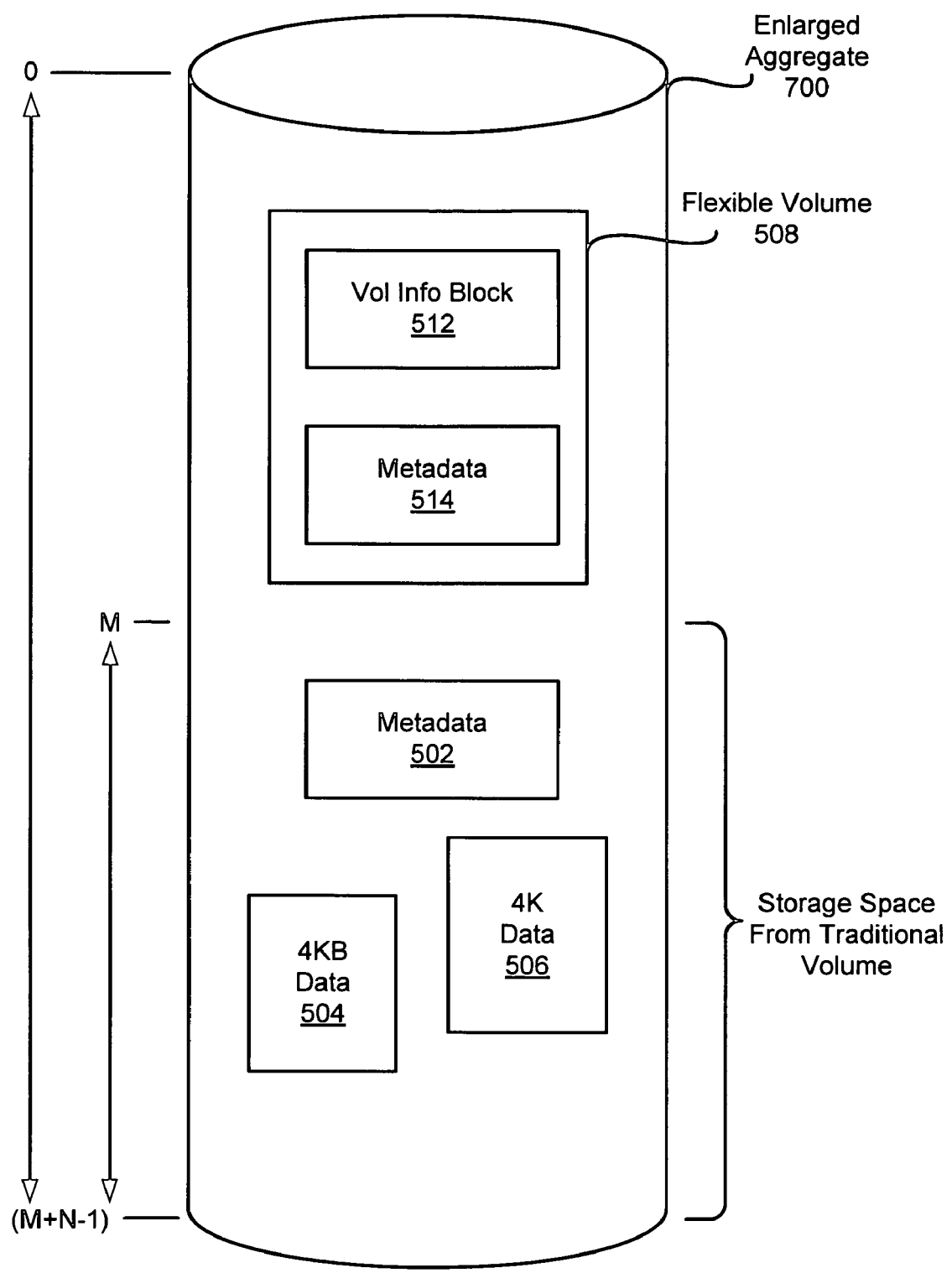
FIG. 7 is a block diagram of the traditional volume of FIG. 5 at a yet further stage of being converted to a flexible volume, according to one embodiment of the present invention.

After all the ABSENT values in the metadata 514 on the flexible volume 508 has been replaced with PVBNs, the storage devices 108 of the traditional volume 500 can be added to the aggregate 510 to form an enlarged aggregate 700, as shown in FIG. 7, and the traditional volume can be dismounted and destroyed, as described below. The volume information block (not shown) on the aggregate 510 is altered to indicate that the aggregate 510 is larger than its initial size. Specifically, the size of the aggregate 510 is increased by about the size of the traditional volume 500.

The storage space of the traditional volume 500 is concatenated to, i.e., added to the end of, the storage space of the aggregate 510. Thus, as shown in FIG. 7, the aggregate 510 (now the extended aggregate 700) is extended beyond VBN (M−1) to VBN (M+N−1). That is, VBNs are concatenated to the aggregate 510 starting at the address beyond the last address (i.e., VBN (M−1)) in the aggregate 510. Consequently, the address space of the aggregate 510 is extended by N blocks to include the 4 KB data blocks 504 and 506 and the corresponding metadata 502.

The storage device 108 of the traditional volume 500 should be added to the aggregate 510 in the same order as these storage devices 108 were used to create the traditional volume 500. Consequently, the blocks of the storage devices 108 will appear in the same relative order in the enlarged aggregate 700 as they did in the traditional volume 500. That is, the block numbers in the extended address space 600 (i.e., M to (M+N−1)) become the VBNs of the corresponding blocks in the enlarged aggregate 700. In addition, the storage devices 108 of the traditional volume 500 should be added to the aggregate 510 in a way that avoids zeroing the storage devices 108, to avoid deleting data from the storage devices 108.

Now that the size of the aggregate 510 is increased, blocks in the extended address space M to (M+N−1) are available for allocation. The metadata (not shown) that describes the container file of the flexible volume 508 is altered to indicate that the container file now includes all the file blocks (such as data blocks 504 and 506) on the traditional volume 500 that were converted. That is, for each PVBN that replaced an ABSENT value in the metadata 514 of the flexible volume 508, the corresponding VBN of the expanded aggregate 700 is marked as being allocated to the flexible volume 508 container file. Thus, the storage allocation bitmap (not shown) of the expanded aggregate 700 indicates that these blocks are allocated, and the metadata (not shown) that describes the container file indicate that the container file occupies these blocks.

Storage space used to store the metadata 502 of the traditional volume 500 can be deallocated. The traditional volume 500 can now be dismounted and destroyed. That is, data structures within the operating system 112 that describe the mounted traditional volume 500 can be deleted (because the traditional volume is no longer mounted), and data structures stored on the storage devices 108 that implement the traditional volume 500 can be deallocated or modified. For example, if the traditional volume 500 is implemented on one or more RAID groups, RAID data structures on each storage device 108 of the RAID group describe the storage device as being part of the RAID group. A conventional volume destruction includes replacing these RAID data structures with data structures that indicate the storage devices 108 are unused and free.

However, in the presently disclosed system, each storage device 108 of the traditional volume 500 is selected in increasing VBN order, i.e., beginning with the storage device(s) 108 that provide the traditional volume 500 block having VBN=0 (zero), and progressing through the storage devices that provide blocks in the traditional volume 500 having progressively larger VBNs. For each storage device 108, the RAID data structure is replaced with a RAID data structure that describes the storage device 108 as being part of the RAID group on which the aggregate 510 is implemented. Progressing in this order causes storage space in the storage devices 108 to appear in the correct order, i.e., starting at VBN M and continuing to VBN (M+N−1), in the extended aggregate 700.

Blocks used to store files on the traditional volume 500 (such as data blocks 504 and 506) remain allocated in the enlarged aggregate 700 to the container file. Unallocated blocks on the traditional volume 500 do not necessarily become part of the container file. Instead, these blocks generally become unallocated blocks on the expanded aggregate 700.

Although the metadata 514 on the flexible volume 508 could have been initialized with PVBN values according to the above-referenced formula, initializing the metadata 514 with ABSENT values is faster. Then, during the normal course of accessing the files on the flexible volume 508, the filer 104 can replace the ABSENT values with calculated PVBNs, and the computational cost and I/O access time to replace the ABSENT values are spread over time, i.e., while the files are accessed. The ABSENT values are replaced in approximately the order in which the corresponding files are accessed. Thus, as a result of initializing the metadata 514 with ABSENT values, the flexible volume 508 becomes available for use by clients sooner, i.e., as soon as the metadata 514 is initialized.

Optionally, in addition to or instead of replacing the ABSENT values as clients access files, a "demand generator," such as a routine within the operating system 112 or an application program executed by the filer 104, can be used to scan the sparse flexible volume 508, searching for blocks with absent pointers. Upon locating such a block, the demand generator determines the PVBN referenced by the absent pointer, as described above, but without requiring an I/O request to implicate the block. The demand generator replaces the ABSENT value with the PVBN. Populating a sparse flexible volume with missing data preferably occurs in connection with a multi-phased sequence. For example, the demand generator can be programmed to execute during otherwise idle or low-usage periods on the filer 104. Optionally, the demand generator is programmed to limit the rate at which it replaces ABSENT values, so as not to place an undue load on the filer 104 and/or the storage devices 108.

Some operating systems include a capability to take "snapshots" of an active file system. A snapshot is a storage space-conservative, read-only set of data structures that enables a client or system administrator to obtain a copy of all or a portion of the file system, as of a particular time in the past, i.e. when the snapshot was taken. Additional information about snapshots is available in the above-referenced and incorporated U.S. Pat. No. 5,819,292.

Snapshots on the traditional volume 500 can be preserved during the conversion to the flexible volume 508. For example, because each snapshot represents an entire file system, the above-described conversion process can be performed on each of the snapshots of the traditional volume 500, starting with the oldest snapshot and proceeding, in turn, through the snapshots in decreasing age order. For each snapshot, all the VBN pointers (ABSENT values) are modified to PVBN values, as discussed above. After each snapshot is converted, a snapshot is taken on the flexible volume 508. After the final snapshot is taken, the traditional volume 500 is destroyed, as described above.

Alternatively, instead of replacing the ABSENT values as clients access files, i.e., generating the enlarged storage allocation bitmap and populating the flexible volume 508 with ABSENT values, the metadata 514 can be initially filled in with PVBNs.

Figure 8:
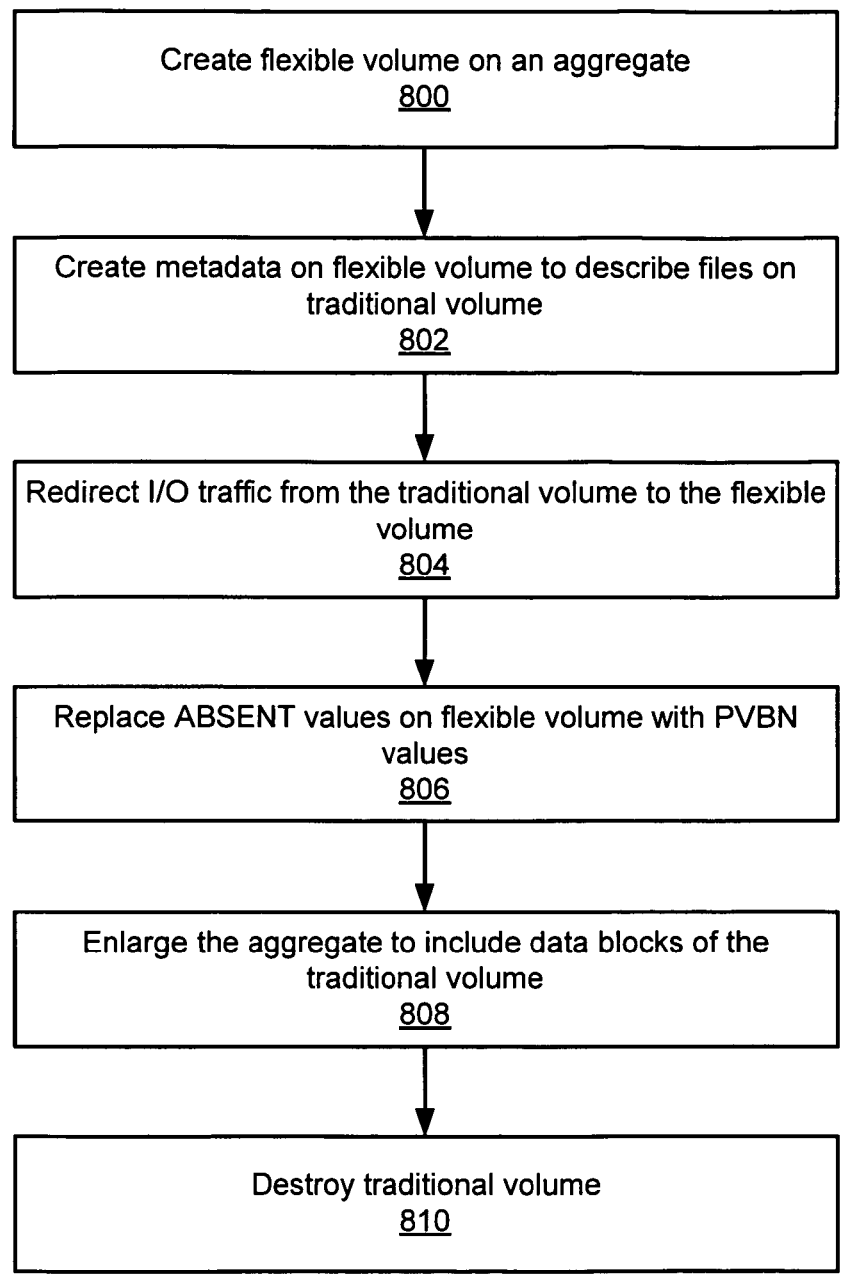
FIG. 8 is a flowchart of a method of converting an existing traditional volume into a flexible volume, according to one embodiment of the present invention.

A process of converting a traditional volume to a flexible volume is illustrated by way of a flowchart in FIG. 8. At 800, a flexible volume large enough to store the metadata of the traditional volume is created on an aggregate. At 802, metadata structures are created on the flexible volume to describe the files of the traditional volume, except that the metadata indicates that data blocks and indirect blocks are absent and must be fetched from another location. At 804, I/O traffic is redirected from the traditional volume to the flexible volume. At 806, the actual locations of the data blocks and indirect blocks on the traditional volume are ascertained and this information is used to replace the ABSENT values in the flexible volume metadata. After all the ABSENT values have been replaced, at 808, the storage devices underlying the traditional volume are appended to the aggregate, and at 810, the traditional volume is destroyed. The operations shown in FIG. 8 need not be performed in the order shown. Furthermore, these operations can be subdivided, combined with other operations shown in the flowchart or combined with other related or unrelated operations.

A method, system and control software for converting traditional volumes to flexible volumes have been described as including or being executed by a processor controlled by instructions stored in a memory. Some of the functions performed by the method, system and control software have been described with reference to flowcharts. Those skilled in the art should readily appreciate that functions, operations, decisions, etc. of all or a portion of each block, or a combination of blocks, of the flowcharts can be implemented as computer program instructions, software, hardware, firmware or combinations thereof. Those skilled in the art should also readily appreciate that instructions or programs defining the functions of the present invention can be delivered to a processor in many forms, including, but not limited to, information permanently stored on non-writable storage media (e.g., read-only memory devices within a computer, such as a ROM, or devices readable by a computer I/O attachment, such as a CD-ROM or DVD-ROM disk), information alterably stored on writable storage media (e.g., floppy disks, hard drives and flash memories) or information conveyed to a computer through a communication medium, including a computer network. In addition, while the invention may be embodied in software, the functions necessary to implement the invention may alternatively be embodied in part or in whole using firmware and/or hardware components, such as combinatorial logic, Application Specific Integrated Circuits (ASICs), Field-Programmable Gate Arrays (FPGAs) or other hardware or a combination of hardware, software and/or firmware components.

While the invention is described through the above-described exemplary embodiments, it will be understood by those of ordinary skill in the art that modifications to, variations of, combinations and sub-combinations of the illustrated embodiments may be made without departing from the inventive concepts disclosed herein. Moreover, while the preferred embodiments are described in connection with various illustrative data structures, one skilled in the art will recognize that the system may be embodied using a variety of data structures. Accordingly, the invention should not be viewed as limited, except by the scope and spirit of the appended claims.

What is claimed is:

1. A method for convening an existing traditional volume into a flexible volume, the existing traditional volume having a first address space that contains a plurality of files and metadata files containing information related to each of the plurality of files, the method comprising:

providing, by a storage server, an additional volume having a second address space that contains a number of data blocks;

creating a flexible volume in the additional volume;

storing metadata on the flexible volume to describe at least one of the plurality of files on the traditional volume;

storing a representative value in the flexible volume metadata describing each of the at least one of the plurality of files to indicate that the physical address information is absent as a result of omitting the physical address information; and extending the second address space to include the at least one of the plurality of files on the traditional volume, such that each of the at least one of the plurality of files has an address in the second address space, wherein the address in the second address space is derived from an address in the first address space plus the number of data blocks in the second address space.

2. The method of claim 1, further comprising:
in response to an input/output (I/O) request directed to at least a portion of one of the plurality of files:
calculating an address in the second address space implicated by the I/O request; and
replacing one of the representative values in the metadata on the flexible volume with the calculated address in the second address space.

3. The method of claim 2, further comprising:
in response to a subsequent I/O request directed to the at least a portion of the one of the plurality of files:
calculating a volume block number (VBN1) in the first address space implicated by the I/O request, according to:
VBN1=PVBN−M, where M is a size of the additional volume; and
fulfilling the I/O request on the traditional volume using the calculated VBN1.

4. The method of claim 1, wherein the traditional volume is implemented on at least one storage device; and further comprising adding the at least one storage device to the additional volume, such that storage space on the at least one storage device is concatenated to the second address space.

5. The method of claim 4, further comprising adding at least a portion of unallocated storage space of the at least one storage device to the additional volume.

6. The method of claim 4, further comprising de-allocating space occupied by at least one of the metadata on the traditional volume.

7. The method of claim 1, further comprising allocating blocks that stored the plurality of files on the traditional volume to the flexible volume.

8. The method of claim 1, wherein the existing traditional volume has a size N that is greater than a size M associated with the additional volume.

9. The method of claim 1, wherein:
the existing traditional volume stores a plurality of persistent point-in-time images; and
storing the metadata on the flexible volume comprises storing metadata on the flexible volume for each of the plurality of persistent point-in-time images.

10. The method of claim 1, further comprising:
storing a representative value in the portion of the flexible volume metadata for each of the at least one of the plurality of files to indicate that the physical address information is absent;
scanning the flexible volume for the representative values in the metadata;
for at least one representative value found while scanning the metadata, calculating an address, in the second address space, of at least a portion of one of the plurality of files associated with the found representative value; and
replacing the found representative value with the calculated address.

11. A system for converting an existing traditional volume into a flexible volume, the existing traditional volume having a first address space that contains a plurality of files and metadata files containing information related to each of the plurality of files, the system comprising:
a plurality of storage devices; and
a network storage filer communicably coupled to the plurality of storage devices and operable to implement a traditional volume and to implement a flexible volume and further operable to:
create a flexible volume on at least one of the plurality of storage devices, the at least one of the plurality of storage devices having a second address space that contains a number of data blocks;
store metadata on the flexible volume to describe at least one of the plurality of files on the traditional volume;
store a representative value in the flexible volume metadata describing each of the at least one of the plurality of files to indicate that the physical address information is absent as a result of omitting the physical address information; and
extend the second address space to include at least one of the plurality of files on the traditional volume, such that each of the at least one of the plurality of files has an address in the second address space, wherein the address in the second address space is derived from an address in the first address space plus the number of data blocks in the second address space.

12. The system of claim 11, where the filer is operative, in response to receiving an input/output (I/O) request directed to at least a portion of one of the plurality of files, to:
calculate an address in the second address space implicated by the I/O request; and
replace one of the representative values in the metadata on the flexible volume with the calculated address in the second address space.

13. The system of claim 12, wherein the filer is operative, in response to a subsequent I/O request directed to the at least a portion of the one of the plurality of files, to:
calculate a volume block number (VBN1) in the first address space implicated by the I/O request, according to:
VBN1=PVBN−M, where M is a size of the additional volume; and
fulfill the I/O request on the traditional volume using the calculated VBN1.

14. The system of claim 11, wherein the traditional volume is implemented on at least one storage device; and the filer is further operative to add the at least one storage device to the additional volume, such that storage space on the at least one storage device is concatenated to the second address space.

15. The system of claim 14, wherein the filer is further operative to add at least a portion of unallocated storage space of the at least one storage device to the additional volume.

16. The system of claim 14, wherein the filer is further operative to de-allocate space occupied by at least one of the metadata on the traditional volume.

17. The system of claim 11, wherein the filer is further operative to allocate blocks that stored the plurality of files on the traditional volume to the flexible volume.

18. The system of claim 11, wherein the existing traditional volume has a size N that is greater than a size M associated with the additional volume.

19. The system of claim 11, wherein the existing traditional volume stores a plurality of persistent point-in-time images; and the filer is further operative to store metadata on the flexible volume for each of the plurality of persistent point-in-time images.

20. The system of claim 11, wherein the filer is further operative to:
store a representative value in the portion of the flexible volume metadata for each of the at least one of the plurality of files to indicate that the physical address information is absent;
scan the flexible volume for the representative values in the metadata;

for at least one representative value found while scanning the metadata, calculate an address, in the second address space, of at least a portion of one of the plurality of files associated with the found representative value; and replace the found representative value with the calculated address.

21. A system for converting an existing traditional volume into a flexible volume, the existing traditional volume having a first address space that contains a plurality of files and metadata files containing information about each of the plurality of files, the system comprising:

a plurality of storage devices; and means, communicably coupled to the plurality of storage devices, for:

creating a flexible volume on at least one of the plurality of storage devices, the at least one of the plurality of storage devices having a second address space that contains a number of data blocks;

storing metadata on the flexible volume to describe at least one of the plurality of files on the traditional volume;

storing a representative value in the flexible volume metadata describing each of the at least one of the plurality of files to indicate that the physical address information is absent as a result of omitting the physical address information; and extending the second address space to include at least one of the plurality of files on the traditional volume, such that each of the at least one of the plurality of files has an address in the second address space, wherein the address in the second address space is derived from an address in the first address space plus the number of data blocks in the second address space.

* * * * *